US010587623B2

(12) United States Patent
Chauhan

(10) Patent No.: US 10,587,623 B2
(45) Date of Patent: Mar. 10, 2020

(54) MOBILE DEVICE PLATFORM FOR ACCESS PRIVILEGE CONTROL SYSTEM

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/036,839

(22) Filed: Jul. 16, 2018

(65) Prior Publication Data

US 2019/0239076 A1    Aug. 1, 2019

Related U.S. Application Data

(60) Provisional application No. 62/624,387, filed on Jan. 31, 2018, provisional application No. 62/624,393, filed on Jan. 31, 2018.

(51) Int. Cl.

| H04M 1/66 | (2006.01) |
| H04L 29/06 | (2006.01) |
| H04W 12/08 | (2009.01) |
| H04W 12/06 | (2009.01) |
| G06F 21/60 | (2013.01) |
| H04W 8/18 | (2009.01) |

(Continued)

(52) U.S. Cl.
CPC .......... *H04L 63/102* (2013.01); *G06F 21/604* (2013.01); *H04L 63/108* (2013.01); *H04M 1/67* (2013.01); *H04W 8/18* (2013.01); *H04W 12/06* (2013.01); *H04W 12/08* (2013.01); *G06F 2221/2141* (2013.01); *H04L 67/306* (2013.01)

(58) Field of Classification Search
USPC .............................. 726/4, 5; 715/716; 705/37
See application file for complete search history.

(56) References Cited

U.S. PATENT DOCUMENTS

| 8,332,500 B1 | 12/2012 | Singleton et al. |
| 8,850,421 B2 | 9/2014 | Proud |
| 9,167,404 B1 | 10/2015 | Freed et al. |

(Continued)

OTHER PUBLICATIONS

U.S. Appl. No. 16/036,862, Non Final Office Action dated Dec. 26, 2019, 42 pages.

*Primary Examiner* — David Q Nguyen
(74) *Attorney, Agent, or Firm* — Han Santos, PLLC

(57) ABSTRACT

This disclosure describes techniques for facilitating a primary account holder (PAH) of a client account to control access privileges of service features that are accessible by secondary account holders (SAH), via the client account. More specifically, an Access Privilege Control (APC) system is described that enables the PAH to generate access privilege rules that control the use of service features by a SAH, that are accessible via the client device(s) associated with the client account. The APC system may associate a set of updated access privilege rules with virtual profile data for clients associated with the client account. The virtual profile data may be transmitted to client devices, or subset thereof, associated with the client account. Further, the APC system may monitor an operation of client devices associated with the client account and provide one or more recommendations to update access privilege rules based on monitored service feature usage.

20 Claims, 9 Drawing Sheets

(51) Int. Cl.
*H04M 1/67* (2006.01)
*H04L 29/08* (2006.01)

(56) References Cited

U.S. PATENT DOCUMENTS

| | | |
|---|---|---|
| 9,425,627 B2 | 8/2016 | Proud |
| 9,510,357 B1 | 11/2016 | Egner et al. |
| 2006/0223495 A1 | 10/2006 | Cassett et al. |
| 2012/0238287 A1 | 9/2012 | Scherzer |
| 2012/0310804 A1 | 12/2012 | Raleigh et al. |
| 2013/0303110 A1 | 11/2013 | Gauthier |
| 2014/0006483 A1* | 1/2014 | Garmark ................. H04L 67/42 709/203 |
| 2014/0006947 A1* | 1/2014 | Garmark ............... G06F 3/0484 715/716 |
| 2014/0047512 A1* | 2/2014 | Sidi ........................ G06F 21/31 726/4 |
| 2014/0189808 A1* | 7/2014 | Mahaffey .............. H04L 63/083 726/4 |
| 2014/0215081 A1 | 7/2014 | Cili et al. |
| 2014/0289824 A1* | 9/2014 | Chan ........................ G06F 9/54 726/5 |
| 2015/0082396 A1* | 3/2015 | Theebaprakasam .... H04L 63/08 726/5 |
| 2015/0092673 A1 | 4/2015 | Singh et al. |
| 2015/0199660 A1* | 7/2015 | Dolan .................... G06Q 20/10 705/37 |
| 2016/0294920 A1* | 10/2016 | Besprosvan ............ H04L 67/10 |
| 2018/0063670 A1 | 3/2018 | Garg et al. |
| 2018/0288060 A1* | 10/2018 | Jackson ................ H04L 63/102 |
| 2018/0373887 A1* | 12/2018 | Smith ................. H04L 63/0428 |
| 2019/0124056 A1* | 4/2019 | Monibi ................... G06F 21/10 |

* cited by examiner

MOBILE DEVICE PLATFORM FOR ACCESS PRIVILEGE CONTROL SYSTEM

RELATED APPLICATIONS

This application claims priority to, commonly owned U.S. Provisional Patent Application No. 62/624,387 filed on Jan. 31, 2018, and titled "Parental Control Mobile Platform Technology," and U.S. Provisional Patent Application No. 62/624,393 filed on Jan. 31, 2018, and titled "Parental Control via a Virtual Profile Platform Technology," which are herein incorporated by reference in their entirety.

BACKGROUND

As mobile device technology continues to advance and produce new and improved iterations of mobile devices in shorter time cycles, users are burdened with having to configure each new mobile device to reflect their preferred user experience. Similarly, some users may interchangeably share a select number of mobile devices among a group of users, such as within a family or work environment. In this example, a primary account holder, or a user who is delegated with administrative privileges, may be burdened with having to re-configure access privileges for individual mobile devices on a case-by-case basis when a user selects a mobile device that has been preconfigured with another user's access privileges.

Traditionally, a Primary Account Holder (PAH), or a delegated user, of a telecommunications service account may create, update, and delete access privileges that affect how other, secondary account holders, interact with a telecommunications service. However, a PAH's ability to create, update or delete parental controls (i.e. access privileges) are generally high-level and low fidelity. By way of example, a PAH may control a secondary account holder (SAH) access to an entire client device, or access to a network service (i.e. voice communications, data communications, and/or so forth). For example, a PAH may impose an access privilege that limits an amount of time that a SAH may access a client device. However, currently, access privileges lack sufficient fidelity to enable a PAH to generate finer-grained access privilege rules and corresponding exception.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
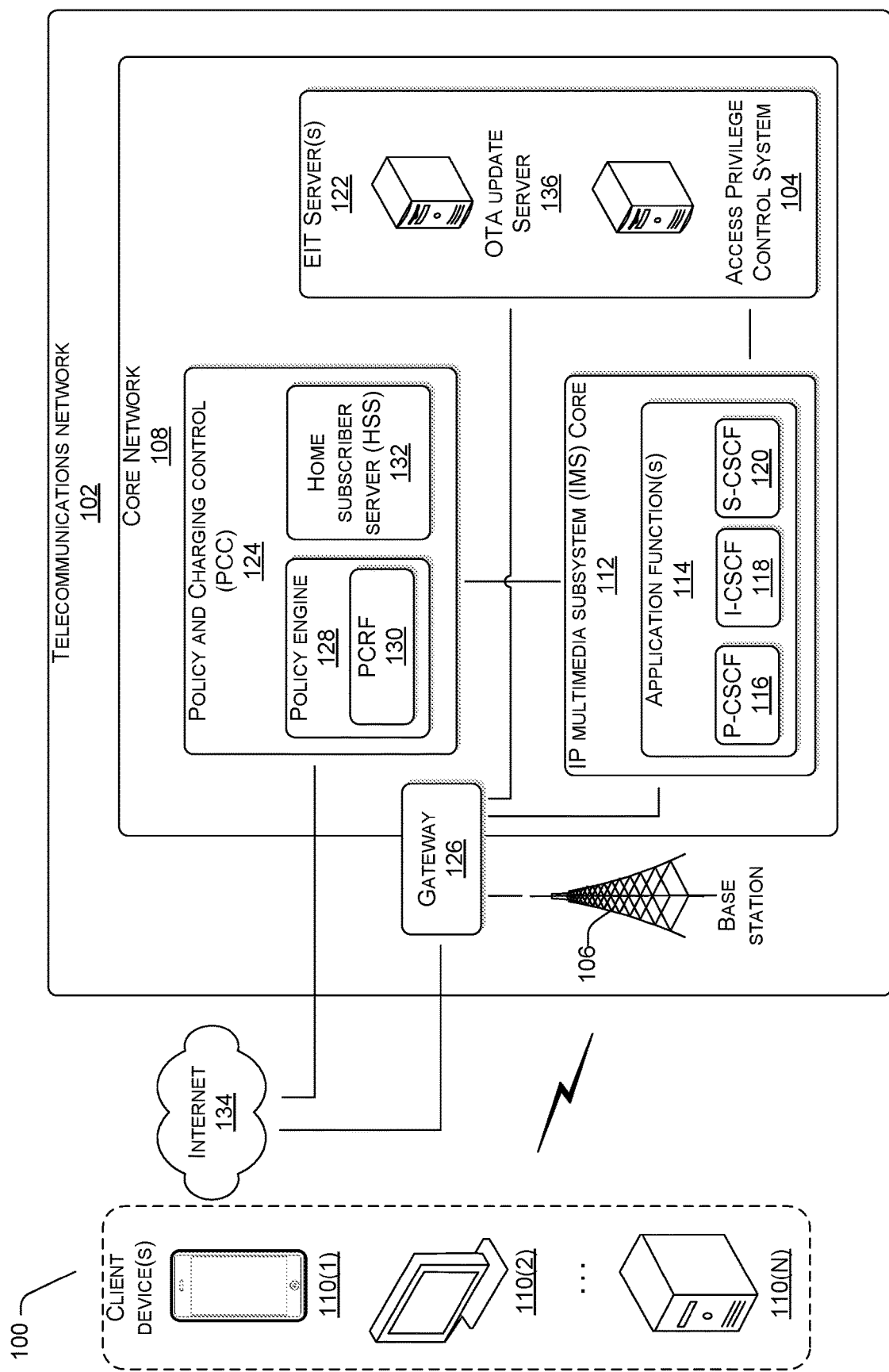
FIG. 1 illustrates a computing environment that facilitates an Access Privilege Control (APC) system.

This disclosure describes techniques for controlling access privileges of one or more service features that are accessible via a client account. More specifically, an Access Privilege Control (APC) system is described that enables a Primary Account Holder (PAH) of the client account to configure high-fidelity access privilege rules for service features accessible via the client account. In some examples, the APC system may associate access privilege rules with virtual profile data of secondary account holders (SAHs) of the client account. The SAHs may include a plurality of clients, each of whom share access to the service features. The Virtual Profile (VP) data may be transmitted to client device(s) associated with the client account. By way of example, a client account may correspond to a telecommunications service account with service features accessible via various mediums of communication (i.e. audio, text, and data communications). The client account may further facilitate access to user applications or application features of the user applications via one of the various mediums of communication.

In various examples, the APC system may be configured to generate access privilege rules for a client, and further associate those access privilege rules with one or more client device(s) assigned to the client, or a plurality of client device(s) that are interchangeably used by the client. By way of example, consider a client account that is shared among family members, with each family member being assigned one client device. In this example, the APC system may configure the client device assigned to a family member with access privilege rules associated with that family member.

In another example, consider a client account whereby some family members of the same family choose to interchangeably share select client device(s) among themselves. In this example, since each of the select client device(s) may be shared among a group of family members, each of the select client device(s) may be configured to include access privilege rules for each family member within the group of family members sharing the select client device(s). It is noteworthy that even though the examples noted herein refer to a family-based client account, this disclosure applies to any other type of client account that is shared among a plurality of clients, such as among work colleagues in a work environment.

This disclosure further describes techniques for generating access privilege rules that control the use of one or more service features by a SAH that are accessible via the client device(s) associated with a client account. In one example, the APC system may receive a request to control access privileges that relate to use of a services feature by a SAH via the client device(s) associated with the client account. In doing so, the APC system may parse through the request to identify the SAH, the service feature, and may further determine one or more activation parameter(s) to be used to generate a set of updated access privilege rules.

The activation parameter(s) may describe a condition that is intended to trigger access privilege rules that control the use of a service feature accessible by a SAH, via the client device(s) of a client account. By way of example, an activation parameter may correspond to a time of day, a day of the week, a geographic location, a context of operation of a client device, or any combination thereof. An activation parameter may also correspond to an indication that a service feature has been accessed by a SAH via a client device of the client account. The context of operation may correspond to a disposition of a SAH at a time of a current use of a service feature. The context of operation may describe whether the SAH is running, walking, in conversation with one or more individuals, or in a moving vehicle. In various examples, the APC system may capture sensor data from a client device associated with a SAH to determine a disposition of the SAH.

In another example, an activation parameter may conditionally permit the use of one or more service feature(s) for an allotment of time over a predetermined time interval or an allotment of data over the predetermined time interval, or a combination of both. In this example, the activation parameter may restrict the use of the one or more service feature(s) following consumption of the allotment of time, the allotment of data, or the combination of both. It is noteworthy that the predetermined time interval described in this example may be established by the PAH or configured by an operator of the APC system as a length of time that extends to a renewal of the allotment of time or the allotment of data (i.e. subscriber billing cycle).

Moreover, in response to receiving a request to control access privileges of a SAH and further determining one or more activation parameters(s), the APC system may generate a set of updated access privilege rules by modifying or deleting existing access privilege rules, adding new access privilege rules, or a combination of both. In one example, the set of updated access privilege rules may permit current use of the service feature by the SAH up to an expiration of an allotment of time or an allotment of data. In another example, the set of updated access privilege rules may restrict current use of the service feature based a time of day, a day of the week, a geographic location, a context of operation, or any combination thereof.

Prior to generating the set of updated access privilege rules, the APC system may be configured to determine whether a client initiating a request to control access privileges of a SAH has an appropriate authorization to do so. Specifically, the APC system may authenticate an identity of the client initiating the request, and further cross-reference the client identity with members of a client account that have authorization to control access privileges of SAHs of the client account. In one example, the PAH of the client account may retain sole authorization to control access privileges of SAHs of the client account. In another example, the PAH may selectively delegate authorization to control access privileges of SAHs to another SAH of the client account. For example, consider a two-parent household whereby one parent is a PAH of a family account and the second parent is a SAH with delegated authorization to control access privileges of other family members (i.e. children and/or other dependents). In this latter example, the APC system may facilitate the PAH in selectively delegating authorization to another SAH of the client account.

In a non-limiting example, the PAH, or a SAH with delegated authorization to control access privileges of other SAHs, may request control of access privileges that relate to use of service features by a SAH that are accessible via the client device(s) of a client account. In this example, the SAH may be a school-aged child, and the request from the PAH may be intended to control access privileges of data communications via a client device associated with the SAH during school hours. Thus, the APC system may parse through the request from the PAH and identify activation parameter(s) that trigger control of access privileges that relate to use of the service feature by the SAH. More specifically, the activation parameter(s) may include a day of the week (i.e. school days), a time of day (i.e. school start time and school end time), geographic location(s) (i.e. school location), or any combination thereof. In doing so, the APC system may generate access privilege rules that control (i.e. restrict) use of data communications based on one or more of the activation parameter(s).

This disclosure further describes controlling access privilege privileges that relate to use of various type of service features accessible via the client account. In this example, the client account may correspond to a telecommunications service account, and the service features may correspond to various mediums of communication accessible via a client device of the client account, user application(s) accessible via a client device of the client account, or application features associated with user application(s) that are accessible via a client device of the client account.

In a first non-limiting example, consider a service feature that corresponds to a medium of communication accessible via a client device of the client account. The medium of communication may include an audio communications medium, a text-based communications medium, or a data communications medium. An audio communications medium may be accessible by the client device directly via telecommunications network infrastructure, or indirectly via a user application operating on the client device. The text-based communications medium may include short message service (SMS), multimedia messaging service (MMS), and email service, and similarly may be accessible by the client device directly or indirectly via the telecommunications network. Data communications may include any network data traffic that is transmitted or received via network interfaces of a client device and may relate to an operation of user applications on a client device or data transfers via the client device.

In this example, the APC system may receive a request from a PAH to control access privileges of a SAH that relate to use of a medium of communication accessible by a SAH associated with the client account. For example, the request may restrict the use of any one of an audio communications medium, a text-based communications medium, or a data communications medium based on one or more criteria. The one or more criteria may include a time of day, a day of the week, allotment of time, allotment of data, geographic location, or any combination thereof. The one or more criteria may further include a permissible list of contacts with whom the SAH may communicate, or an impermissible-list of contacts with whom the SAH may not communicate. In various examples, the permissible-list and impermissible-list of contacts may be defined by the PAH and may include contact identifiers, such as phone numbers, email addresses, username identifiers, or any combination thereof.

In some examples, the APC system may interact with an APC application that resides on a SAH client device to intercept a communication intended for delivery to the SAH client device (i.e. client device associated with a SAH). More specifically, an APC application that resides on the SAH client device may monitor and detect the use of service features accessible via the client device. In doing so, the APC application may intercept a communication intended for delivery to the SAH client device and determine whether the communication violates the set of updated access privilege rules that reside on the client device. In one example, the APC application may determine that the contact initiating the communication is listed on an impermissible-list of contacts associated with the SAH. In this example, the APC application may transmit a message to the APC system indicating that the communication has been intercepted and that the communication violates the set of updated access privilege rules. In doing so, the APC system may transmit a message to a PAH client device (i.e. client device associated with a PAH) indicating that delivery of the communication has been intercepted. The message may further include one or more selectable options to permit delivery of the communication to the SAH client device, re-direct delivery of the communication to the PAH client device or deny delivery of the communication to the SAH client device.

Further, the APC system may, permit delivery the instance of communication to a SAH client device or the PAH client device, or deny delivery of the communication to the SAH client device based on receipt of a response to the message from the PAH client device.

In a second non-limiting example, consider a service feature that corresponds to a user application that is accessible via a client device of the client account. The user application may include one of a social media application, social networking application, multimedia-sharing application, gaming application, or multimedia-playback application, or any other user application executable on a client device.

In this example, the APC system may receive a request from a PAH to control access privileges of a SAH that relate to use of a user application, such as a multimedia playback application, that is accessible via a client account. The request may further indicate that control of the access privileges is based on one or more criteria, such as an allotment of time or an allotment of data. In this example, the APC system may generate access privilege rules that permit the use of the user application (i.e. multimedia playback application) on the client device(s) associated with the SAH based on the allotment of time or data. Stated another way, the APC system may generate access privilege rules that restrict the use of the user application following an indication that the allotment of time or data has been consumed by the client.

In a third non-limiting example, consider a service feature that corresponds to an application feature of a user application accessible via a client device of the client account. The application feature may complement activities within a user application and may correspond to features such as uploading data, downloading data, streaming data, interacting via varying communications media, and/or so forth.

In this example, the APC system may receive a request from a PAH to control access privileges of a SAH that relate to use of an application feature for a user application accessible via a client account. The request may further permit the unimpeded use of the remaining application features of the user application. For example, consider a gaming application (i.e. user application) that is accessible via a client device of a client account. The gaming application may include a plurality of application features, such as permitting users to play a game offline, online gaming with a select number of known participants, or online gaming with a non-select number of participants. By way of example, the APC system may receive a request from a PAH to control access privileges of a SAH that relate to the application feature for online gaming with a non-select number of participants. In this way, the APC system may generate access privilege rules that control the use of the application feature relating to online gaming with a non-select number of participants, while permitting the unimpeded use of remaining application features, which include offline gaming and online gaming with a select number of known participants.

In another example, consider a social media application (i.e. user application) that is accessible via a client device of a client account. The social media application may include a plurality of application features, such as permitting online messaging with established connections, streaming data from a social media platform, uploading data onto the social media platform, or downloading data from the social media platform. By way of example, the APC system may receive a request from a PAH to control access privileges of a SAH that relate to an application feature for uploading or downloading data via the social media application via the client account. In this way, the APC system may generate access privilege rules that control the use of the application feature relating to uploading and downloading data via the social media application, while permitting the use of remaining application features, which include online messaging with established connections, and streaming data from a social media platform.

In each of the three non-limiting examples, the APC system may integrate the set of updated access privilege rules with virtual profile data of the SAH that is identified within the request from the PAH. Further, the APC system may transmit the virtual profile data to one or more client device(s) associated with the client, thus ensuring that the access privilege rules are in effect, irrespective of which client device the SAH chooses to use. In one example, the APC system may determine that the SAH has been assigned one client device, thus may transmit the virtual profile data to that one client device. In another example, the APC system may determine that the SAH has been authorized—by a PAH—to use a select number of the client device(s) associated with the client account. In this example, the APC system may transmit the virtual profile data to the select number of client device(s). The select number of client device(s) may include a portion of, but not all, the client device(s) associated with the client account. Alternatively, the select number of client device(s) may include all client device(s) associated with the client account.

The virtual profile data associated with a client (i.e. PAH or SAH) may include client-specific personal data, digital representation client-specific data, client-preferred device boot settings, client-specific online and offline device access privileges, client-specific application settings, client-specific personalized client device settings, or any combination thereof. In some examples, client-specific personal data may include personally-identifiable data (i.e. name, birthdate, etc.), demographic data, residential data, employment data, client account subscription data, and/or so forth.

In various examples, an APC application that resides on a client device may be configured to monitor an operation of a client device associated with a SAH to detect an attempt to use a service feature that is subject to the set of updated access privilege rules. The APC application may monitor the client device on a continuous basis, per a predetermined schedule, or in response to a triggering event. The predetermined schedule may be set by an operator of the APC system or the PAH and may correspond to a time interval of one minute, five minutes, 30 min, 60 minutes, etc. Any time interval is possible. Further, the triggering event may correspond to receipt of an indication that the SAH has accessed a particular service feature via a client device of the client account.

Moreover, the APC application may intercept an operating system call to use a service feature on the client device. In doing so, the APC application may compare the SAH's current use of the service feature with the set of updated access privilege rules that reside on the client device. In response to determining that the SAH's current use of the service feature violates at least one of the updated access privilege rules, the APC application may transmit a message to the APC system indicating the same. The APC system may transmit a response message to the APC application that terminates the operating system call to use the service feature and further causes display of a message on a user interface of the client device that indicates that an attempt to use the service feature has been intercepted.

Additionally, the APC system may generate recommendations for delivery to a PAH based at least in part on monitoring a SAH's usage of service features accessible via a client device of the client account. For example, the APC system may receive, from the APC application that resides on the client device, monitored metadata associated usage of service features accessible via the client device. The APC system may parse through the monitored metadata and cluster together instances of service feature usage that relate to each client (i.e. PAHs and SAHs) of the client account. An analysis of service feature usage may be based on an identity of each client (i.e. PAH or SAH), which is derived from authentication credentials used to access each of the client device(s) of the client account. The monitored metadata may be derived over a predetermined time interval that is set by the PAH or an operator of the APC system. Any predetermined time interval is possible.

In some examples, the APC system may use one or more trained machine learning models to analyze instances of service feature usage that relate to each client. In some examples, the APC system may aggregate current service feature usage with historical service feature usage to refine an analysis or generate a client-trend over a predetermined time interval. Further, the APC system may use the analysis to generate recommendations for delivery to a PAH of the client. In some examples, the resultant analysis may be represented as a statistical model that correlates service feature usage with at least one of a time of day, a day of the week, an amount of time consumed by the SAH using the service feature, or an amount of data consumed by the SAH using the service feature.

In this way, the APC system may identify instances of service feature usage that consume a disproportionate allocation of time or data relative to other instances of service feature usage. For example, a SAH may consume a disproportionate amount of data while downloading multimedia files from a social networking application (i.e. application feature of a user application). In this example, the APC system may provide a recommendation to control access privileges that limits an amount of data allocation that may be consumed while downloading multimedia files from the social networking application. A recommendation may also include an adjustment of an activation parameter that is configured to control access privileges of a service feature.

In some examples, the APC system may transmit a message to the PAH that includes one or more recommendations that are based on analysis of the monitored service feature usage. The message may include one or more selectable options to accept or reject the recommendation. In one example, the PAH may respond with a selection to accept the recommendation. In doing so, the APC system may automatically generate a set of updated access privilege rules for the client account that are based on the recommendation. Referring to the earlier example, the set of updated access privilege rules may include an additional access privilege rule that controls an amount of data allocation that a client may consume while downloading multimedia files from a social networking application.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment 100 of a telecommunications network 102 that facilitates an Access Privilege Control (APC) system 104. The APC system 104 may be configured to enable a primary account holder (PAH) of a client account to configure high-fidelity access privileges for service features accessible via the client account.

The telecommunications network 102 may include multiple base stations, such as base station 106, as well as a core network 108 that serves one or more client device(s) 110(1)-110(N). In the illustrated example, the client device(s) 110(1)-110(N) may be associated with a client account, such as a telecommunications service account. The client account may include a plurality of clients, each of whom shares access to service features accessible via the telecommunications network 102. The service features may include various mediums of communication, such as audio, text, and data communications. Service features may also include user applications and application features of user applications that are accessible via the telecommunications network (i.e. client account).

In various examples, an IP Multimedia Subsystem (IMS) core 112 may reside in the core network 108. The IMS core 112 may include an application function (AF) 114, such as a Proxy Call Session Control Function (P-CSCF) 116, an Interrogating Call Session Control Function (I-CSCF) 118, and a Service Call Session Control Function (S-CSCF) 120. The P-CSCF 116 behaves like a proxy by accepting requests and serving them internally or forwarding them towards another entity, such as Enterprise Information Technology (EIT) server(s) 122. The S-CSCF 120 acts as a Session Initiation Protocol (SIP) registrar and in some cases as a SIP redirect server. The S-CSCF 120 is responsible for processing the location registration of a client device, client authentication, and call routing and processing. The I-CSCF 118 is tasked with selecting an S-CSCF 120 for serving an initial SIP request, particularly when a client device initiating the request does not know which S-CSCF 120 should receive the request.

Additionally, the core network 108 may further include a Policy and Charging Control (PCC) 124 and a gateway 126. The PCC 124 may enable detection of communication service data flow and provide parameters for policy control and/or charging control. In the illustrated example, the PCC 124 may include a policy engine 128, such as a Policy and Charging Rules Function (PCRF) 130, and a Home Subscriber Server (HSS) 132. The HSS 132 may be configured to authenticate an identity of a client and authorize operation of a corresponding client device on the telecommunications network 102.

Further, the gateway 126 may include one or more servers and related components that are tasked with providing connectivity between the IMS core 112, the client device(s) 110(1)-110(N) and the internet 134. More specifically, the gateway 126 may act as a point of entry and exit for data traffic.

Moreover, the core network 108 may further include one or more Enterprise Information (EIT) server(s) 122, such as but not limited to, the APC system 104 and an Over-The-Air (OTA) update server 136. The APC system 104 may be configured to generate a high-fidelity of access privileges for service features accessible via the client account. Further, the APC system 104 may further transmit virtual profile data associated with a client operating one of the client device(s) 110(1)-110(N) via the telecommunications network. The virtual profile data may include virtual profile instantiations of individual clients associated with a client account.

In the illustrated example, a Primary Account Holder (PAH) of a client account may transmit, via one of the client device(s) 110(1)-110(N), a request to control access privileges associated with a Secondary Account Holder (SAH) of the client account. The request may be received at the P-CSCF 116. The P-CSCF 116 may interact with the I-CSCF 118 to identify a correct S-CSCF 120 to route the incoming request. The S-CSCF 120 may further route the request to the APC system 104. The APC system 104 may parse through the request and generate a set of updated access privilege rules that control access privileges relating to the use of service features, by the SAH, that are accessible via the client account.

Moreover, the APC system 104 may transmit the set of updated access privilege rules to the OTA update server 136 for transmission to select client device(s) 110(1)-110(N) associated with the client account. In one example, the APC system 104 may direct the set of updated access privilege rules to one of the client device(s) 110(1)-110(N) that is assigned to the SAH. In another example, the set of updated access privilege rules may be directed towards a subset of the client device(s) 110(1)-110(N) associated with the SAH. In yet another example, the set of updated access privilege rules may be directed to all client device(s) 110(1)-110(N) associated with the client account.

In various examples, an APC application that resides on client device(s) 110(1)-110(N) may monitor an operation of client device(s) 110(1)-110(N) to detect an attempt to use a service feature that is subject to the set of updated access privilege rules. In doing so, the APC application may transmit an indication to the APC system 104 indicating that use of a service feature has been intercepted and violates at least one access privilege rule. In doing so, the APC system 104 may terminate use of the service at the client device associated with the SAH. Additionally, or alternatively, the APC system 104 may generate a recommendation for delivery to one of the client device(s) 110(1)-110(N) that is associated with the PAH. The recommendation may be directed towards permitting the use of the service feature at the client device of the SAH or re-directing use of the service feature to the client device of the PAH.

In the illustrated example, the telecommunications network 102 may provide telecommunications and data communications in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. The computing environment 100 may include a core network 108. The core network 108 may provide telecommunication and data communication services to multiple client devices, such as a 3G-compatible client device and an LTE an LTE-compatible client device, collectively referred to as client device(s) 110(1)-110(N). The client device(s) 110(1)-110(N) may correspond to any sort of electronic device operating on the telecommunications network, such as a cellular phone, a smartphone, a tablet computer, an electronic reader, a media player, a gaming device, a personal computer (PC, a laptop computer), etc. The client device(s) 110(1)-110(N) may have a subscriber identity module (SIM), such as an eSIM, to identify the respective electronic device to a telecommunications service provider network (also referred to herein as "telecommunications network").

Additionally, the APC system 104 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device(s) 110(1)-110(N) via one or more network(s). The one or more network(s) may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
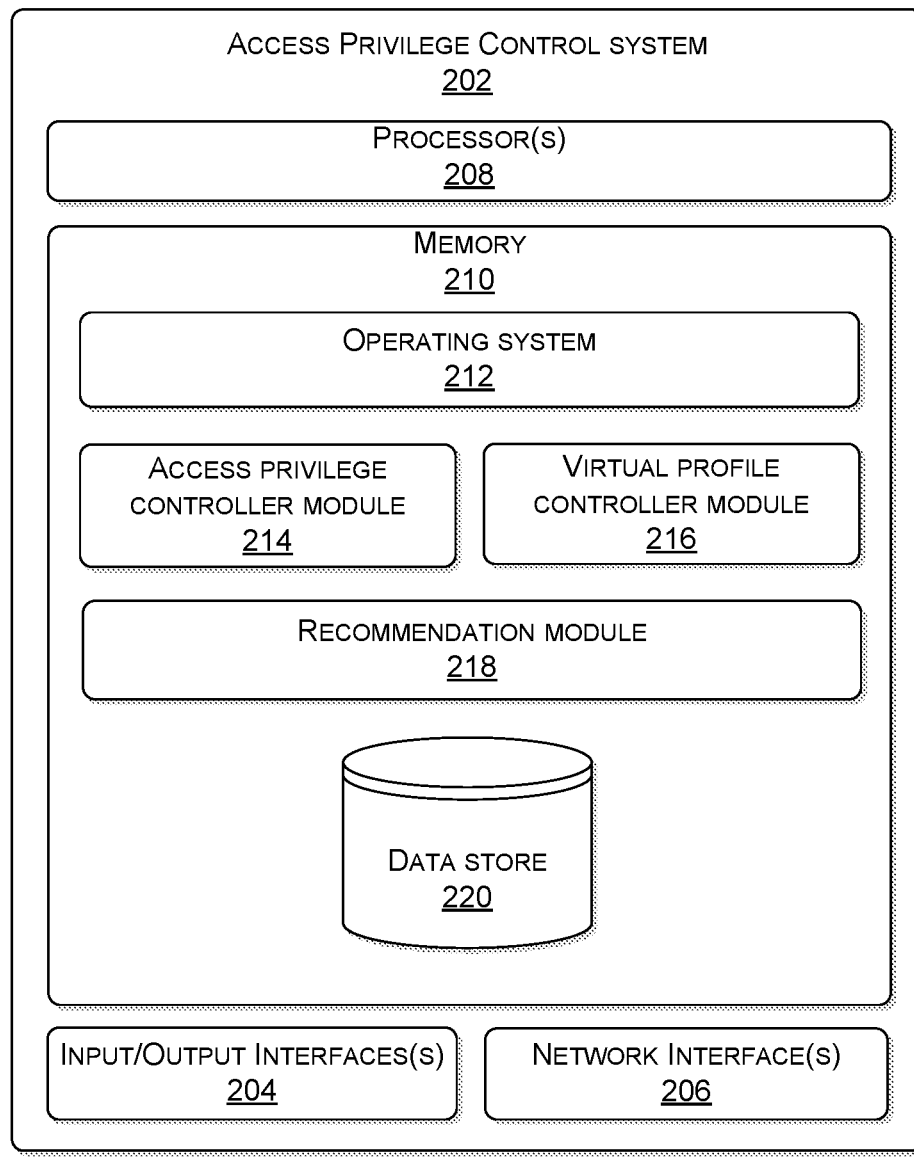
FIG. 2 illustrates a block diagram of various components of an Access Privilege Control (APC) system.

FIG. 2 illustrates a block diagram of various components of an Access Privilege Control (APC) system. The APC system 202 may include routines, program instructions, objects, and/or data structures that perform particular tasks or implement abstract data types. Further, the APC system 202 may include input/output interface(s) 204. The input/output interface(s) 204 may include any type of output interface known in the art, such as a display (e.g. a liquid crystal display), speakers, a vibrating mechanism, or a tactile feedback mechanism. Input/output interface(s) 204 may also include ports for one or more peripheral devices, such as headphones, peripheral speakers, or a peripheral display. Further, the input/output interface(s) 204 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the APC system 202 may include network interface(s) 206. The network interface(s) 206 may include any sort of transceiver known in the art. For example, the network interface(s) 206 may include a radio transceiver that performs the functions of transmitting and receiving radio frequency communications via an antenna. In addition, the network interface(s) 206 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 206 may include wired communication components, such as an Ethernet port or a Universal Serial Bus (USB).

Further, the APC system 202 may include one or more processor(s) 208 that are operably connected to memory 210. In at least one example, the one or more processor(s) 208 may be a central processing unit(s) (CPU), graphics processing unit(s) (GPU), both a CPU and GPU or any other sort of processing unit(s). Each of the one or more processor(s) 208 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 208 may also be responsible for executing all computer applications stored in the memory, which can be associated with common types of volatile (RAM) and/or non-volatile (ROM) memory.

In some examples, memory 210 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 210 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 210 may include an operating system 212, an access privilege controller module 214, a virtual profile controller module 216, a recommendations module 218, and a data store 220. The operating system 212 may be any operating system capable of managing computer hardware and software resources. The access privilege controller module 214 may be configured to receive a request to control access privileges of a service feature associated with a client account. In some examples, the access privilege controller module 214 may employ one or more data mining algorithms to analyze the request to identify a service feature, a criterion to control the corresponding access privilege, and an identity of the SAH that is the subject of the request. Moreover, the access privilege controller module 214 may parse through a data record associated with the client account to determine whether the client initiating the request is authorized to control access privileges of the SAH identified within the request. The access privilege controller module 214 may identify a subset of existing access privilege rules that relate to the request, and further generate a set of updated access privilege rules based at least in part on the request by modifying or deleting existing access privilege rules, adding new access privilege rules, or a combination of both. The access privilege controller module 214 may further transmit the set of updated access privilege rules to one or more client devices associated with the client account.

In some examples, the access privilege controller module 214 may be configured to further intercept an operating system call to access a service feature, by a SAH, via a client device, further authenticate an identity of the SAH initiating the operating system call and determine whether the SAH is authorized to access the service feature. In response to determining that the SAH is authorized to access the service feature, the access privilege controller module 214 may permit the operating system call to access the service feature. Alternatively, the access privilege controller module 214 may determine that the SAH is not authorized to access the service feature, and further generate and deploy a first data packet to a client device associated with a PAH. The first data packet may include computer-executable instructions that provide the PAH with one or more selectable options to terminate the operating system call, permit the operating system call, or re-direct the operating system call to a PAH. In response to receiving a selection from the PAH, the access privilege controller module 214 may generate and deploy a second data packet to a client device associated with the SAH that terminates, permits, or re-directs the operating system call, based at least in part on the response from the PAH.

Further, the virtual profile controller module 216 may be configured to receive a request to usage one or more service features accessible via a client account. In some examples, the virtual profile controller module 216 may receive the request from a client device initiating the request or the access privilege controller module 214. Further, the virtual profile controller module 216 may authenticate an identity of a client initiating the request and further retrieve virtual profile (VP) data associated with a corresponding client account. The VP data may include a set of updated access privilege rules, client-specific personal data, digital representation of client-specific data, client-preferred device boot data settings, client-specific online and offline device access privileges, client-specific application settings, client-specific personalized client device settings, or any combination thereof. In doing so, the virtual profile controller module 216 may generate and deploy a data packet to a client device associated with the client initiating the request. The data packet may include computer executable instructions that automatically update the client device with the VP data.

Moreover, the recommendation module 218 may generate a recommendation to update access privilege rules based on monitoring an operation of a client device. In one example, the recommendation module 218 may receive a Virtual Profile (VP) data packet from an Access Privilege Control (APC) application that is native to a client device. The VP data packet may include monitored metadata associated with the operation of one or more client devices over a predetermined time interval. The monitored metadata may include instances of service feature usage.

The recommendation module 218 may further analyze the monitored metadata and cluster together instances of service feature usage that relate to each client of the client account. In some examples, the recommendation module 218 may use one or more trained machine learning algorithms to analyze instances of service feature usage. In some examples, the recommendation module 218 may aggregate service feature usage with historical service feature usage to refine analysis or generate a client-trend of a time interval. In doing so, the recommendation module 218 may generate at least one recommendation for delivery to a client device associated with a PAH, based at least in part on the analysis of the service feature usage. The recommendation may relate to control of access privileges of a service feature accessible via a client account. In some examples, the recommendation module 218 may further generate and deploy a recommendation message to the client device of the PAH that includes selectable options to accept or reject the recommendation. In response to receiving a response from the PAH, the recommendation module 218 may automatically incorporate the recommendation into the client account.

Additionally, the data store 220 may include client data associated with a client account. The client data may include a set of existing access privilege rules, a set of updated access privilege rules and versions thereof, client-specific personal data, digital representation client-specific data, client-preferred device boot settings, client-specific online and offline device access privileges, client-specific application settings, client-specific personalized client device settings, or any combination thereof. In some examples, client-specific personal data may include personally-identifiable data (i.e. name, birthdate, etc.), demographic data, residential data, employment data, client account subscription data, and/or so forth.

Figure 3:
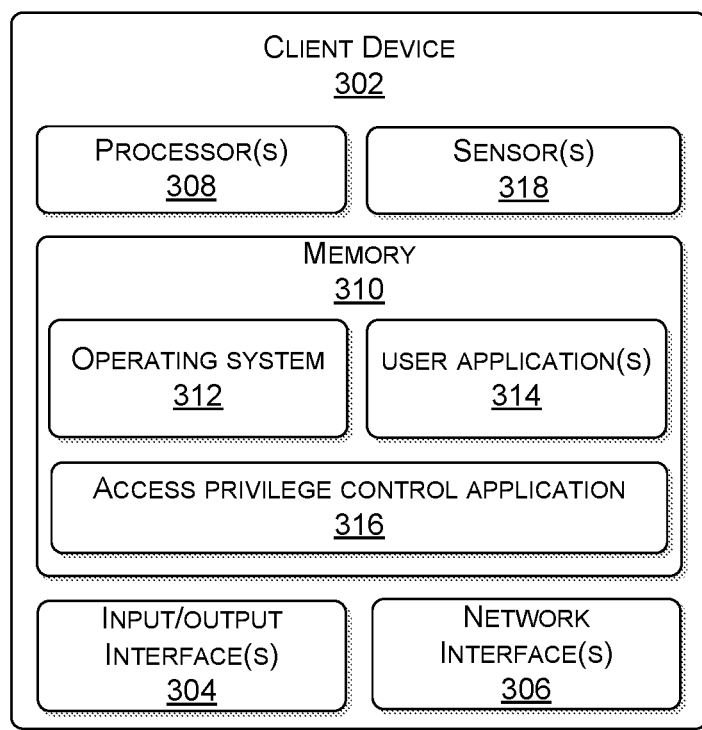
FIG. 3 illustrates a block diagram of various components of a client device 302 that interacts with the Access Privilege Control (APC) system.

FIG. 3 illustrates a block diagram of various components of a client device 302 that interacts with the Access Privilege Control (APC) system. The client device 302 may correspond to one of the client device(s) 110(1)-110(N). Particularly, the client device 302 may be communicatively coupled to the APC system 104 via the telecommunications network 102, via the network interface(s) 306. Network interface(s) 306 may be similar to network interface(s) 206 and include any sort of transceiver in the art. The input/output interface(s) 304 may be similar to input/output interface(s) 204 and include any type of input or output interface known in the art. In this example, the client device 302 may transmit and receive data packets to and from the APC system 104 via the network interface(s) 306. The data packets may include data transmissions sent by a client device, data transmissions intended for the client device, 302, or data transmission that are intended for a computing resource. The data transmissions may include audible data, video data, Short Messaging Service (SMS) data, Multimedia Messaging Service (MMS) data, or any other form communications data associated with a client device. The data transmissions may also include computer-executable instructions intended for transmission to a computing resource.

In some examples, the data packets may automate a performance of one or more actions on the computing resource.

In the illustrated example, the client device 302 may include one or more processor(s) 308 operably connected to memory 310. The one or more processor(s) 308 may be similar to the one or more processor(s) 208, and the memory 310 may be similar to the memory 210.

In the illustrated example, the memory 310 may include an operating system 312, user application(s) 314 and an access privilege control (APC) application 316. The operating system 312 may be used to implement the user application(s) 314 and the APC application 316. The operating system may be any operating system capable of managing computer hardware and software resources. The user application(s) 314 and the APC application 316 may include routines, program instructions, objects, and/or data structures that perform particular tasks or implement particular abstract data types.

The user application(s) 314 may correspond to any executable application on the client device 302. In various examples, the user application(s) 314 may rely on a communication medium to interact with the internet, via the network interface(s) 306. The user application(s) 314 may include one of a social media application, social networking application, multimedia-sharing application, gaming application, or a multimedia-playback application.

The APC application 316 may be configured to interact with the APC system 104 of the telecommunications network 102. More specifically, the APC application 316 may receive a data packet that includes the set of updated access privilege rules for the client account. In another example, the client device may receive virtual profile data that includes the set of updated access privilege rules for the client account. In both examples, the APC application 316 may be configured to automatically update the client device with the set of updated access privilege rules.

In various examples, the APC application 316 may be configured to detect and intercept an operating system call to access a service feature via the client device. In doing so, the APC application 316 may determine whether the initiating client is authorized to access the service feature, based at least in part on the set of updated access privilege rules that reside on the client device.

Further, the APC application 316 may be configured to monitor an operation of the client device 302 to detect the use of one or more service features accessible via a client account. In doing so, the APC application 316 may generate a VP data packet for transmission to the APC system. The VP data packet may include monitored metadata associated with the operation of the client device over a predetermined time interval. The monitored metadata may include instances of service feature usage via the client device. In some examples, the monitored metadata may include a client identifier associated with each instance of service feature usage. The client identifier may be particularly relevant for client devices that are interchangeably shared among a plurality of clients. Further, the monitored metadata may also include the allotment of time or the allotment of data that was consumed for each instance of service feature usage.

The client device 302 may further include sensor(s) 318 that are configured to determine a context of operation and geographic location of the client device 302. The context of operation may correspond to a disposition of a SAH at a time of a current use of a service feature. The context of operation may describe whether the SAH is running, walking, in conversation with one or more individuals, or in a moving vehicle. The sensor(s) 318 may include one or more of accelerometers, gyroscopes, a Global Positioning System (GPS) sensor, and proximity sensors. The accelerometers and proximity sensors may generate sensor data to determine a motion of the client device 302. The gyroscope sensors may generate sensor data to determine an orientation of the client device 302. The GPS sensor may generate sensor data to determine a geographic location of the client device 302.

FIGS. 4, 5, 6, 7, 8, and 9 present processes 400, 500, 600, 700, 800, and 900 that relate to operations of the Access Privilege Control (APC) system. Each of processes 400, 500, 600, 700, 800, and 900 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, 600, 700, 800, and 900 are described with reference to the computing environment 100 of FIG. 1.

Figure 4:
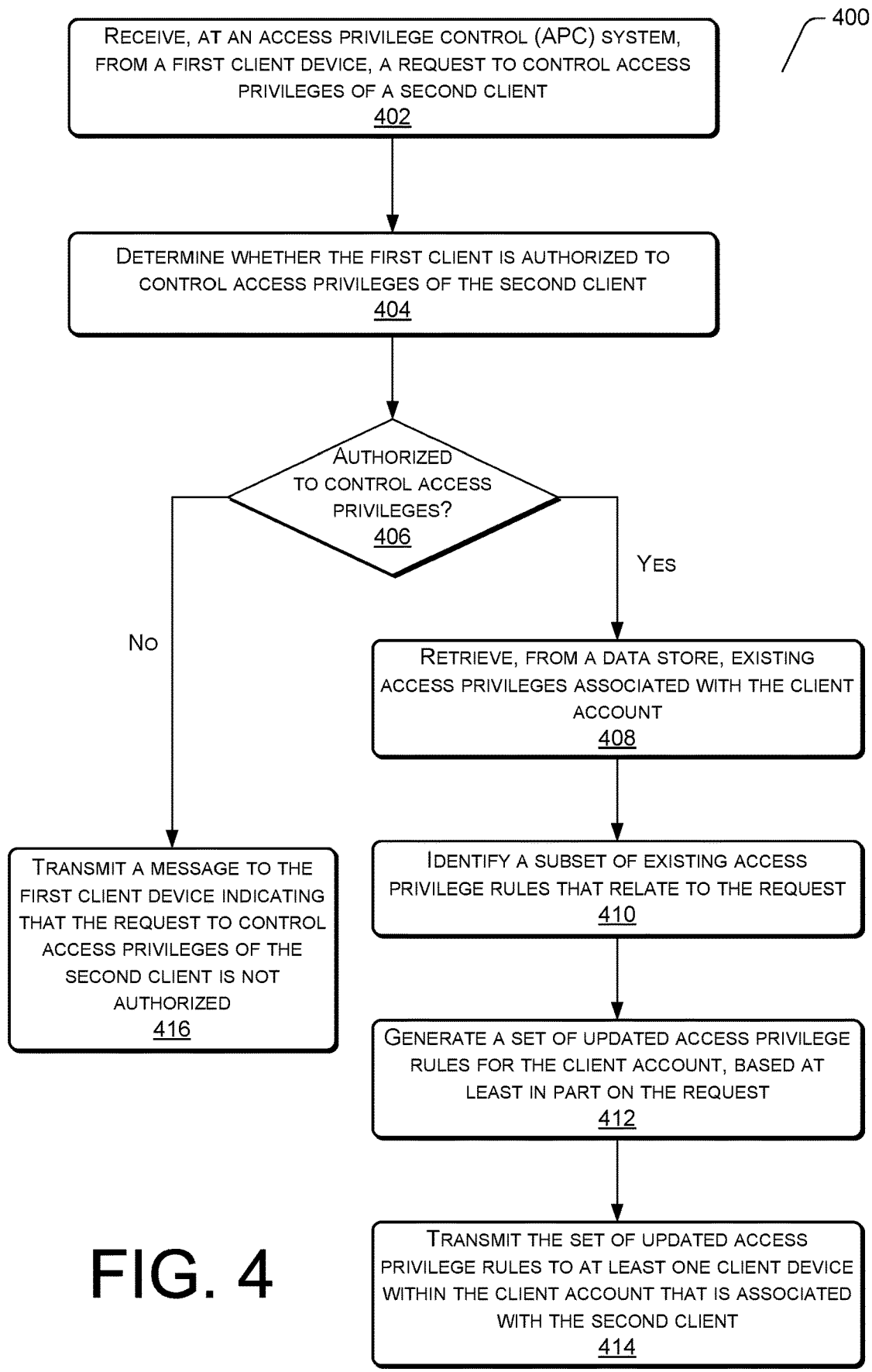
FIG. 4 illustrates a process for generating a set of updated access privilege rules that control access by a Secondary Account Holder (SAH) to service features accessible via a client device of a client account.

FIG. 4 illustrates a process for generating a set of updated access privilege rules that control access by a Secondary Account Holder (SAH) to service features accessible via a client device of a client account. In this example, the client account may correspond to a telecommunications service account, and the service features may be associated with one or more of various mediums of communication (i.e. audio, text, and data communications) via the client account or user applications, including application features, that are accessible via a client account.

At 402, the Access Privilege Control (APC) system may receive, from a first client device associated with the client account, a request to control access privileges of a service feature associated with the client account. In various examples, the request may identify the SAH and further describe criteria used to control access privilege of the service feature.

At 404, the APC system may determine whether a first client associated with the first client device is authorized to control access privileges of the second client. In this example, the APC system may transmit, to the first client device, a request for the first client to provide authentication credentials, such as a username-password combination, authentication token, biometric authentication data, or any other authentication data that may be used to authenticate an identity of the first client.

At 406, in response to authenticating an identity of the first client, the APC system may parse through a data record associated with the client account to determine whether the first client is authorized to control access privileges associated with the second client. In one example, the first client may be a Primary Account Holder (PAH) of the client account with authorization to control access privileges of the second client. In another example, the first client may be a Secondary Account Holder (SAH) with delegated authority to control access privileges of the second client. For example, consider a two-parent household whereby one parent is a PAH of a family client account and the second parent is a SAH with delegated authorization to control access privileges of other family members (i.e. dependents, etc.).

At 408, the APC system may determine that the first client is authorized to control access privileges of the second client. In doing so, the APC system may retrieve from a data store, one or more existing access privilege rules that relate to service features accessible via the client account.

At 410, the APC system may identify a subset of existing access privilege rules that relate to the request. More specifically, the subset of existing access privilege rules may relate to a service feature identified within the request from the PAH. For example, the request from the PAH may relate to use of an application feature to download social media data from a social media application (i.e. user application). In this example, the APC system may identify a subset of existing access privilege rules associated with the user application, the application feature to download media data and a data communications media that facilitates the download.

At 412, the APC system may generate a set of updated access privilege rules, based at least in part on the request. In some examples, the APC system may generate the set of updated access privilege rules by modifying or deleting existing access privilege rules, adding new access privilege rules, or a combination of both.

At 414, the APC system may transmit the set of updated access privilege rules to at least a second client device associated with the second client, a SAH. Alternatively, the APC system may transmit the set of updated access privilege rules to a subset of client devices within the client account that is associated with the second client, or all client devices associated with the client account.

Returning to step 406, the APC system may determine that the first client is not authorized to control access privileges of the second client. In doing so, process 400 may continue to step 416. At 416, the APC system may transmit a message to the first client device indicating that the request to control access privileges of the second client is not authorized.

Figure 5:
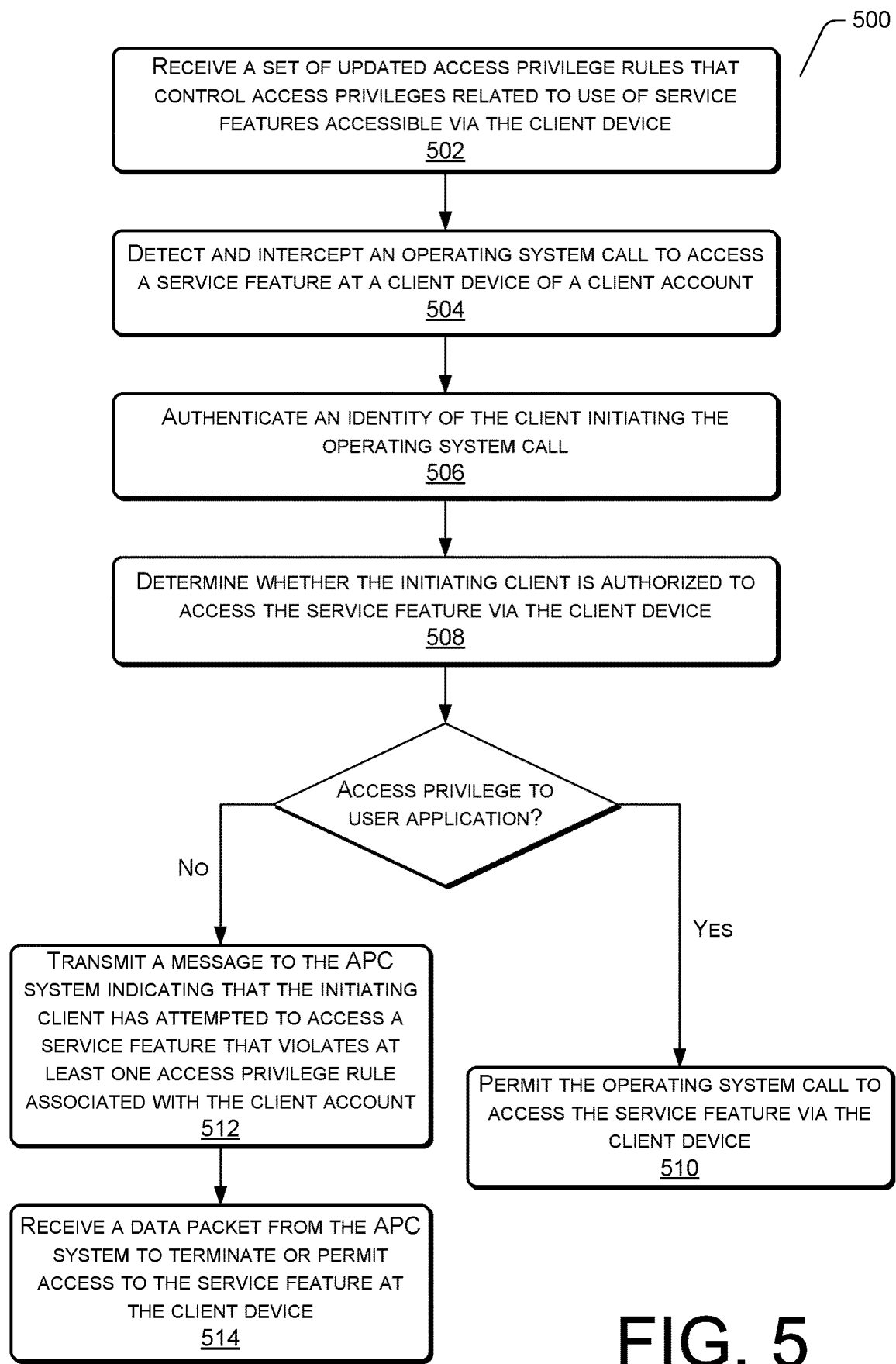
FIG. 5 illustrates a process for intercepting an operating system call to access a service feature and further determining whether the initiating client is authorized to access the service feature.

FIG. 5 illustrates a process for intercepting an operating system call to access a service feature and further determining whether the initiating client is authorized to access the service feature. In this example, an Access Privilege Control (APC) application that resides on a client device may determine whether an initiating client is authorized to access a service feature based at least in part on a set of updated access privilege rules associated with the client account. It is noteworthy that even though process 500 is performed by the APC application that resides on the client device, process 500 may be performed remotely, by the APC system.

At 502, an APC application that resides on a client device of a client account may receive, from an APC system, a set of updated access privilege rules that control access privileges related to use of services feature accessible via the client device. In one example, the client device may receive a data packet that includes the set of updated access privilege rules for the client account. In another example, the client device may receive virtual profile data that includes the set of updated access privilege rules for the client account. The virtual profile data may include one set of updated access privilege rules for the client account. Alternatively, the virtual profile data may include virtual profile instantiations associated with each client of the client account. Each virtual profile instantiation may include a set of updated access privilege rules associated with a corresponding client.

At 504, the APC application may detect and intercept an operating system call to access a service feature via the client device. In this example, the client account may correspond to a telecommunications service account, and the service feature may include various mediums of communication, such as audio, text, and data communications. Service features may also include user applications and application features of user applications that are accessible via the telecommunications network (i.e. client account).

At 506, the APC application may authenticate an identity of the client initiating the operating system call. In doing so, the APC application may further determine whether the client is a Primary Account Holder (PAH) of the client account or a Secondary Account Holder (SAH) of the client account.

At 508, the APC application may determine whether the initiating client is authorized to access the service feature via the client device, based at least in part in part on their authenticated identity and the updated access privilege rules. For example, the APC application may determine that the operating system call is associated with a service feature that is controlled by the set of updated access privilege rules. Therefore, the APC application may determine whether the initiating client, based on their authenticated identity as a PAH or SAH, is authorized to access the service feature, based at least in part on the set of updated access privilege rules.

At 510, the APC application may determine that the initiating client is authorized to access the service feature via the client device, based at least in part on the analysis of the set of updated access privilege rules. In doing so, the APC application may permit the operating system call to access the service feature via the client device.

At 512, the APC application may determine that the initiating client is not authorized to access the service feature via the client device. In doing so, the APC application may transmit a message to the APC system, indicating that the initiating client has attempted to access a service feature that violates at least one access privilege rule within the set of updated access privilege rules. In some examples, the APC system may interact with a Primary Account Holder (PAH) of the client account to determine whether to terminate the operating system call, permit the operating system call, or re-direct the operating system call to a client device associated with the PAH.

At 514, the APC application may receive a data packet from the APC system that terminates access to the service feature at the client device or permits access to the service feature at the client device, based at least in part on an interaction with the APC system and the PAH.

Figure 6:
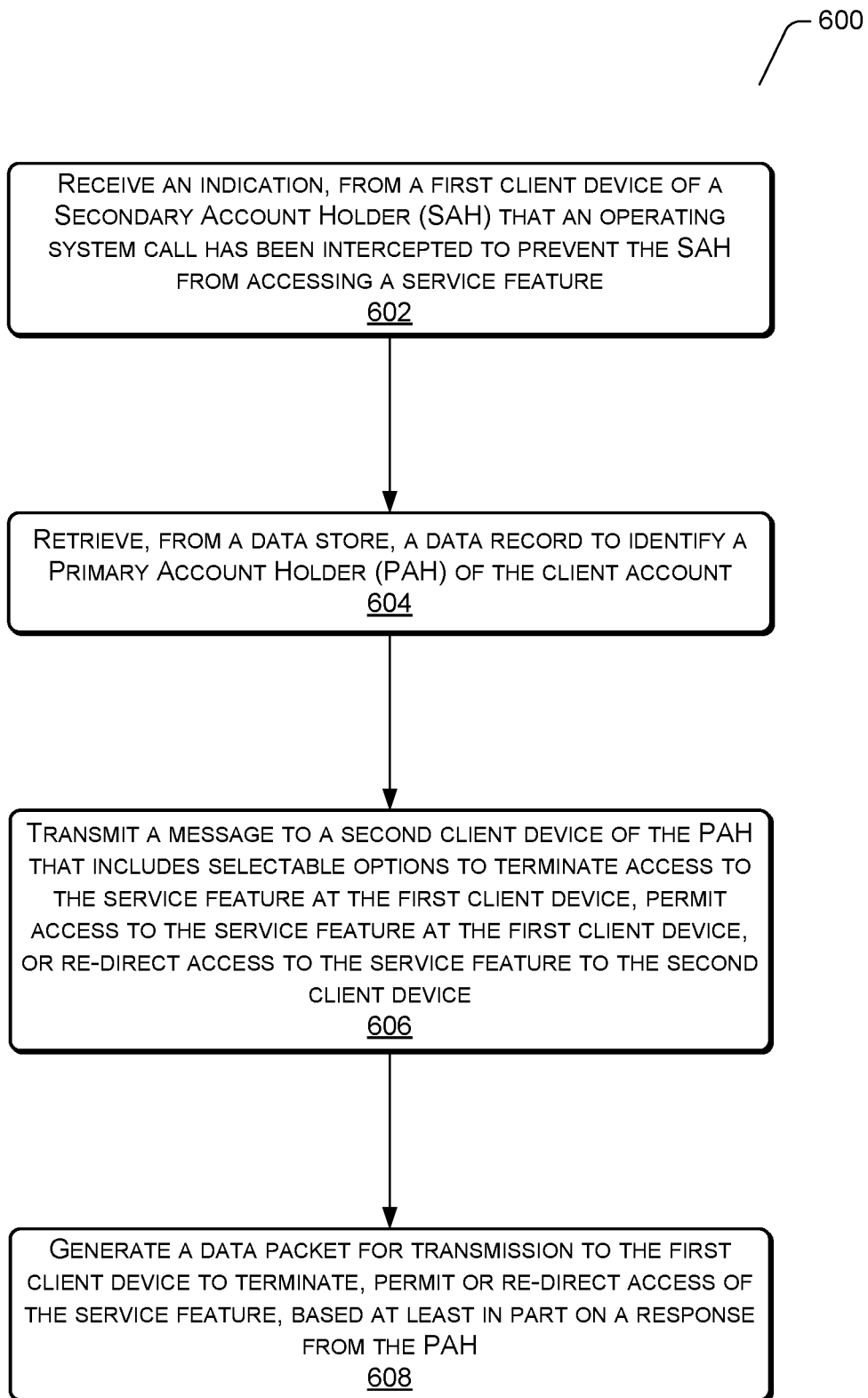
FIG. 6 illustrates a process for monitoring an operation of a client device of a Secondary Account Holder (SAH) and further resolving an attempt to use a service feature that violates a set of updated access privilege rules.

FIG. 6 illustrates a process for monitoring an operation of a client device of a Secondary Account Holder (SAH) and further resolving an attempt to use a service feature that violates a set of updated access privilege rules.

At 602, the APC system may receive an indication, from a client device of a SAH that an operating system call has been intercepted, and that the SAH—the initiating client—is not authorized to access the service feature via the client device. In various examples, the APC system may receive the indication from an APC application that resides on the client device of the SAH.

At 604, the APC system may retrieve, from a data store, a data record associated with the client account, and further identify a Primary Account Holder (PAH) of the client account. The APC system may further identify a second client device associated with the PAH.

At 606, the APC system may transmit a message to the second client device associated with the PAH that includes one or more selectable options to terminate access to the service feature at the first client device, permit access to the service feature at the first client device, or re-direct access to the service feature from the first client device to the second client device. Additionally, or alternatively, the APC system may include selectable options to permit access to the service feature at the first client device for a limited amount of time or transmit a warning message to the SAH at the first client device in conjunction with permission to access the service feature.

At 608, the APC system may receive, from the second client device of the PAH, a response to the message that corresponds to one of the three selection options. In doing so, the APC system may generate a data packet for transmission to the first client device that terminates, permits, or re-directs access of the service feature, based at least in part on the response from the PAH. In some examples, the APC system may be configured to provide the PAH with a predetermined amount of time to respond to the message from the APC system. The predetermined amount of time may be set by an operator of the APC system or the PAH. In the event that the PAH fails to respond to the message within the predetermined amount of time, the APC system may be configured to make a default selection. The default selection may correspond to re-directing the message to another client device of another SAH who has delegated authority to control access privileges of the SAH or terminating access of the service feature. In various examples, an operator of the APC system or the PAH may set the default selection.

Figure 7:
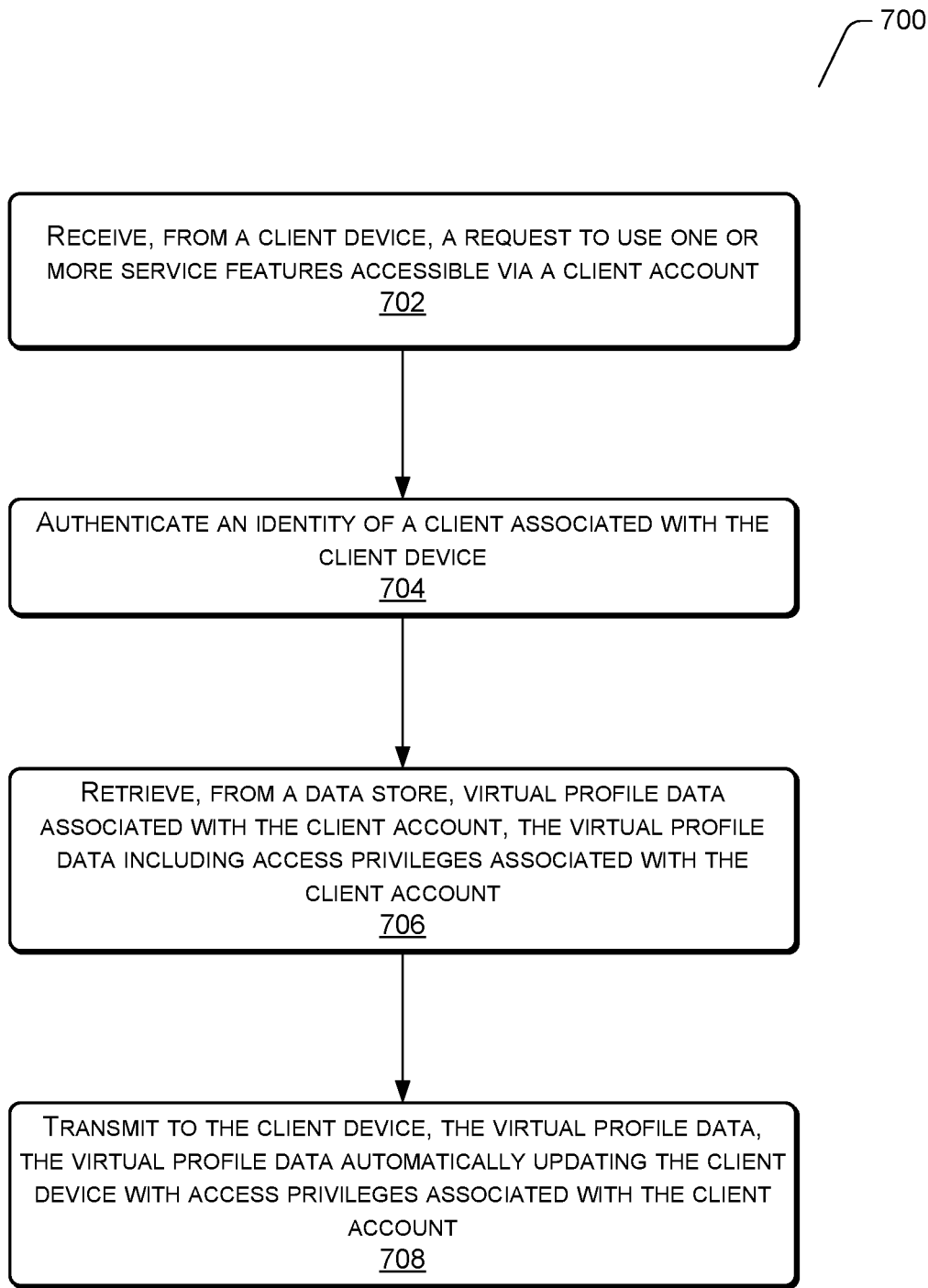
FIG. 7 illustrates a process for updating a client device with a set of updated access privilege rules based on virtual profile data.

FIG. 7 illustrates a process for updating a client device with a set of updated access privilege rules based on virtual profile data. The virtual profile data may include one set of updated access privilege rules the client account. Alternatively, the virtual profile data may include virtual profile instantiations associated with each client of the client account. Each virtual profile instantiation may further a set of updated access privilege rules that control access privileges that relate to the use of one or more service features accessible via the client account.

At 702, the APC system may receive from a first client device, a request to use one or more service features accessible via a client account. In one example, the client account may correspond to a telecommunications service account and the one or more service features may correspond to a medium of communication accessible via the telecommunications service account. The medium of communication may correspond to one of an audio communications medium, a text-based communications medium, a data-based communications medium, or any other appropriate communications medium.

At 704, the APC system may authenticate an identity of a client associated with the first client device. In some examples, the APC system may transmit a request to the first client device for the client to provide authentication credentials, such as a username-password combination, authentication token, biometric authentication data, or any other authentication data that may be used to authenticate an identity of the client.

At 706, in response to authenticating an identity of the client, the APC system may retrieve, from a data store, virtual profile data associated with the client account. In some examples, the virtual profile data may include the set of updated access privilege rules, client-specific personal data, digital representation client-specific data, client-preferred device boot settings, client-specific online and offline device access privileges, client-specific application settings, client-specific personalized client device settings, or any combination thereof.

At 708, the APC system may transmit to the client device the virtual profile data. In various examples, the virtual profile data may be received by an APC application that resides on the client device. In some examples, the APC application may automatically update the client device with a corresponding set of updated access privilege rules based on the Virtual Profile (VP) data.

Figure 8:
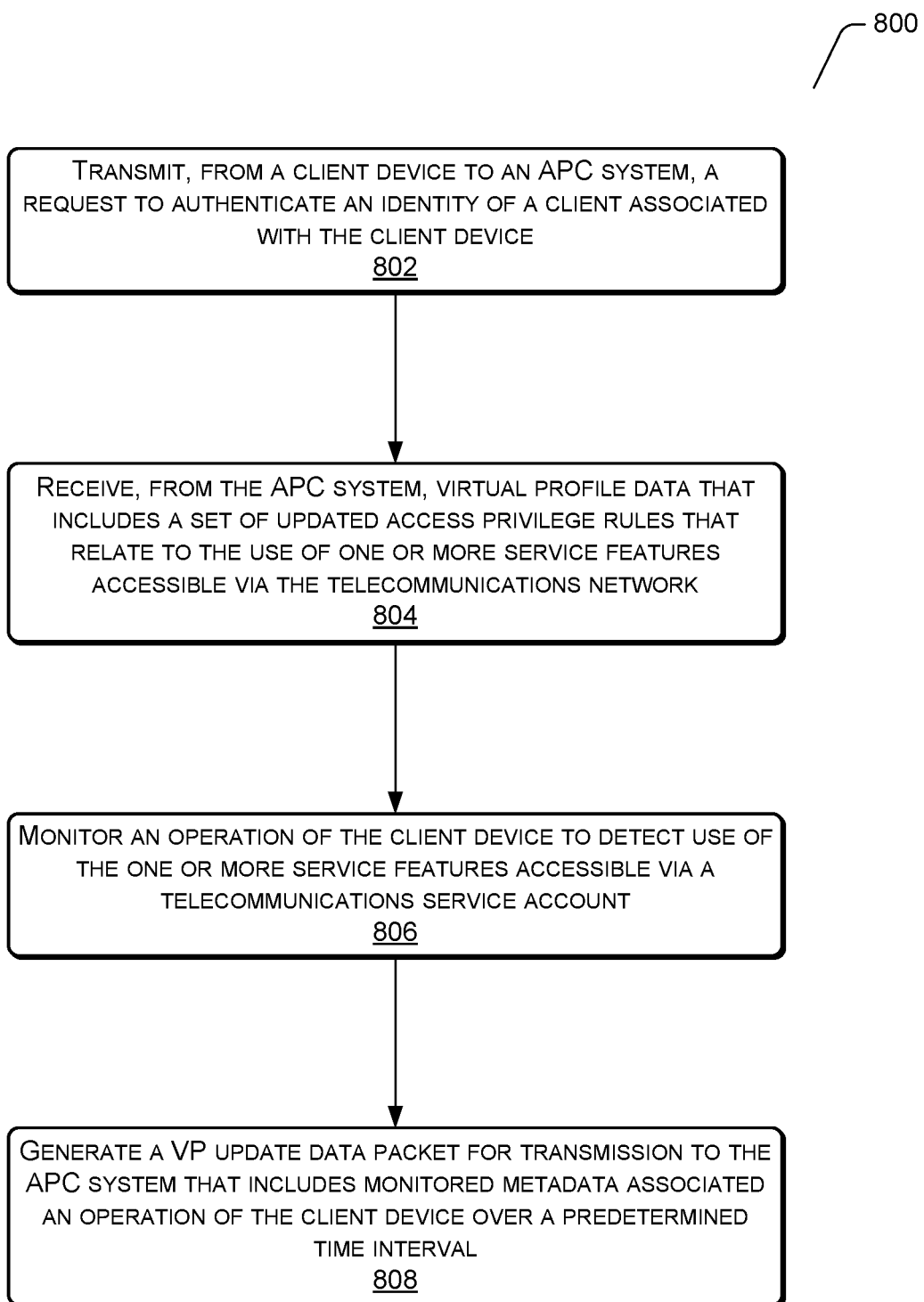
FIG. 8 illustrates a process for monitoring an operation of a client device to detect the use of one or more service features accessible via a telecommunications service account.

FIG. 8 illustrates a process for monitoring an operation of a client device to detect the use of one or more service features accessible via a telecommunications service account. In various examples, monitored metadata generated by the monitoring operation may be used to generate recommendations relating to access privilege rules for the one or more service features.

At 802, a client device may transmit to an APC system, a request to authenticate an identity of a client associated with the client device. In some examples, the APC system may be associated with a telecommunications network, and the request to authenticate the identity of the client may be further associated with a telecommunications service account of the telecommunications network.

At 804, the client device may receive from the APC system virtual profile data that includes a set of updated access privilege rules. The set of updated access privilege rules may control access privileges that relate to the use of one or more service features accessible via the telecommunications network. In some examples, an APC application that resides on the client device may automatically update the client device with the set of updated access privilege rules.

At 806, the client device may monitor an operation of the client device to detect the use of one or more service features accessible via the telecommunications service account. In various examples, the monitoring operation may be performed by the APC application that resides on the client device. The client device may monitor the operation of the client device on a continuous basis, per a predetermined schedule, or in response to a triggering event. In some examples, the triggering event may correspond to an indication that the client has attempted to use a service feature accessible via the telecommunications network.

At 808, the client device, via the APC application, may generate a VP data packet for transmission to the APC system. The VP data packet may include monitored metadata associated with the operation of the client device over a predetermined time interval. The monitored metadata may include instances of service feature usage via the client device. In some examples, the monitored metadata may include a client identifier associated with each instance of service feature usage. The client identifier may be particularly relevant for client devices that are interchangeably shared among a plurality of clients. Further, the monitored metadata may also include the allotment of time or the allotment of data that was consumed for each instance of service feature usage.

Figure 9:
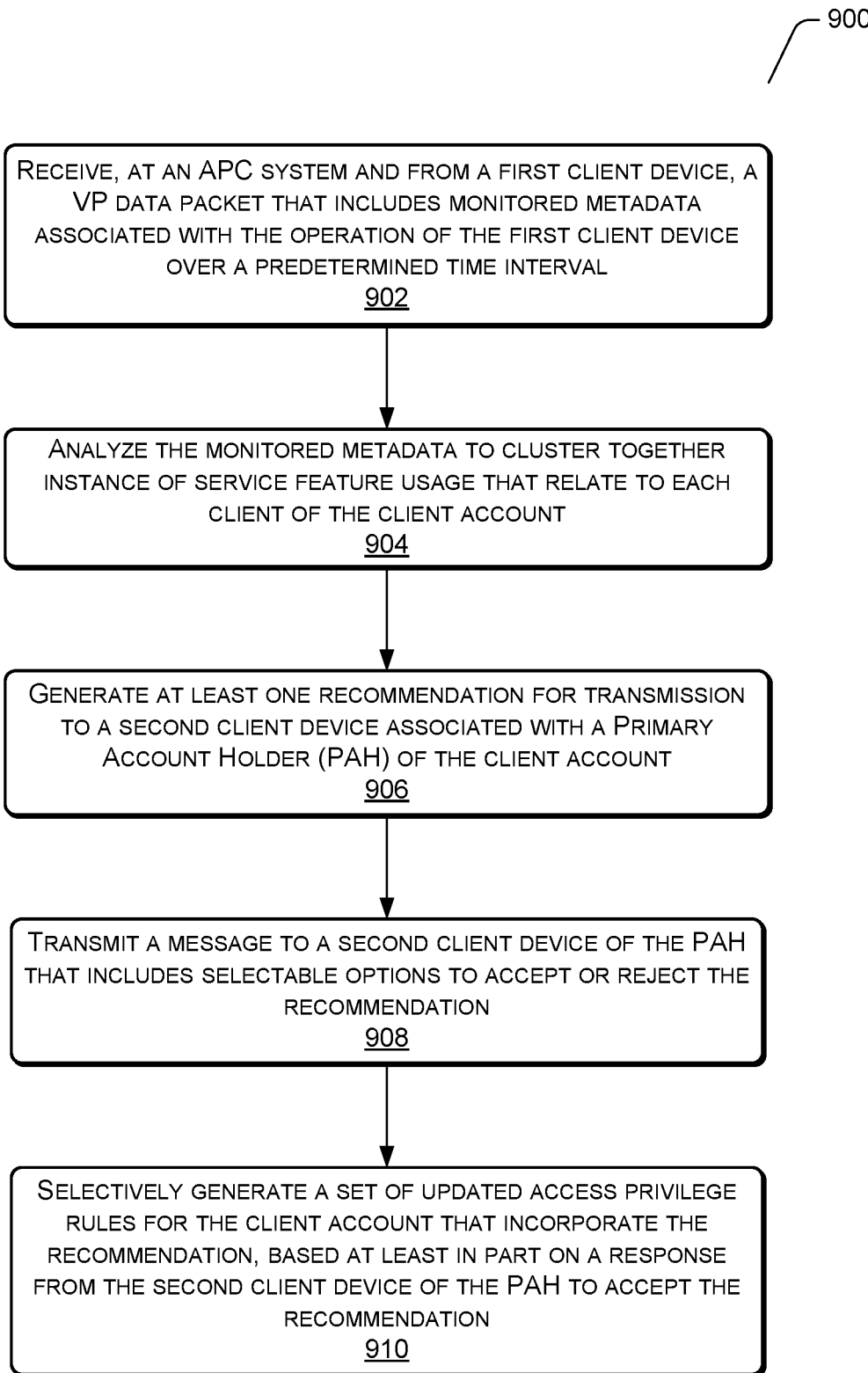
FIG. 9 illustrates a process for generating a recommendation to update access privilege rules based on monitoring an operation of a client device.

FIG. 9 illustrates a process for generating a recommendation to update access privilege rules based on monitoring an operation of a client device. In this example, process 900 is a continuation of process 800. In this example, the client account may correspond to a telecommunications service account of a telecommunications network.

At 902, the APC system may receive, from a client device, a VP data packet that includes monitored metadata associated with the operation of one or more client devices over a predetermined time interval. The monitored metadata may include instances of service feature usage via the client device. Service feature usage may include the use of a communication medium, such as an audio communication medium, text-based communication medium, or data-based communication medium. In addition, service feature usage may also relate to usage of user applications or application features of user applications that are accessible via the telecommunications network.

At 904, the APC system may analyze the monitored metadata and cluster together instances of service feature usage that relate to each client (i.e. PAHs and SAHs) of the client account. In some examples, the APC system may use one or more trained machine learning algorithms to analyze instances of service feature usage, including an allotment of time or an allotment of data that is consumed for each instance of service feature usage. In some examples, the APC system may aggregate service feature usage with historical service feature usage to refine the analysis or generate a client-trend over a time interval.

At 906, the APC system may generate at least one recommendation for delivery to a second client device associated with a Primary Account Holder (PAH) of the client account, based at least in part on analysis of service feature usage. The recommendation may relate to control of access privileges that limit an amount of data allocation that may be consumed by a service feature. In a non-limiting example, the APC system may generate a recommendation to restrict an allocation of data for a service feature in response to determining that the data consumed by the service feature is disproportionately higher than relative to other service features. The recommendation may also include an adjustment of an activation parameter that is configured to control access privileges of the service feature.

At 908, the APC system may transmit a recommendation message to the second client device of the PAH that includes selectable options to accept or reject the recommendation.

At 910, the APC system may receive a response from the second client device of the PAH to accept or reject the recommendation. In one example, the response from the PAH may be to accept the recommendation. In doing so, the APC system may automatically generate a set of updated access privilege rules for the client account that incorporate the recommendation. In another example, the response from the PAH may be to reject the recommendation, at which point the APC system may end process 900. In some examples, the APC system may be configured to provide the PAH with a predetermined amount of time to respond to the recommendation message. The predetermined amount of time may be set by an operator of the APC system or the PAH. In the event that the PAH fails to respond to the recommendation message within the predetermined amount of time, the APC system may be configured to make a default selection. The default selection may be to resend the recommendation message again or reject the recommendation. In various examples, an operator of the APC system or the PAH may set the default selection.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method, comprising:
    under control of one or more processors:
    receiving, from a first client device associated with a first client, a request to control access privileges of a service feature accessible with a client account, the service feature being begins by at least a second client of the client account;
    retrieving, from a data store, one or more existing access privilege rules associated with the client account;
    identifying a subset of the one or more existing access privilege rules that relate to the service feature, based at least in part on the request;
    generating a set of updated access privilege rules for the client account, based at least in part on an analysis of the subset of the one or more existing access privilege rules;
    dynamically integrating the set of updated access privilege rules with the one or more existing access privilege rules to create a set of updated access privilege rules for the client account; and
    transmitting the set of updated access privilege rules to at least a second client device associated with the second client.

2. The computer-implemented method of claim 1, further comprising:
    identifying a plurality of client devices associated with the client account, and wherein, transmitting the updated access privilege rules to at least the second client device further includes transmitting the updated access privilege rules to the plurality of client devices.

3. The computer-implemented method of claim 1, wherein the request further includes authentication credentials associated with the first client, and further comprising:
   verifying an identity of the first client as a primary account holder of the client account, based at least in part on the authentication credentials; and
   determining that the first client is authorized to control access privileges associated with the service feature accessible by at least the second client, and
   wherein, generating the set of updated access privilege rules for the client account is further based at least in part on the first client having authorization to control access privileges associated with the service feature.

4. The computer-implemented method of claim 1, further comprising:
   determining that the service feature corresponds to a user application accessible by at least the second client via the second client device, based at least in part on analysis of the request, and
   wherein the set of updated access privilege rules are configured to control use of the user application via the second client device.

5. The computer-implemented method of claim 1, further comprising:
   determining that the service feature corresponds to an application feature of a user application accessible by at least the second client via the second client device, and
   wherein the set of updated access privilege rules are configured to control use of the application feature and simultaneously permit uncontrolled use of remaining application features of the user application.

6. The computer-implemented method of claim 1, further comprising:
   determining that the service feature corresponds to a communication medium accessible by the second client via the second client device, the communication medium corresponding to at least one of a voice-based communications medium, a text-based communications medium, or a data-based communications medium, and
   wherein the set of updated access privilege rules are configured to control use of the communication medium via the second client device.

7. The computer-implemented method of claim 6, further comprising:
   monitoring an operation of the second client device to detect an attempt to use the communication medium;
   intercepting receipt of an instance of communications data via the communication medium prior to delivery to the second client device;
   determining that delivery of the instance of communications data to the second client device violates the set of updated access privilege rules associated with the client account;
   transmitting, to the first client device, a message that includes one or more selectable options to permit delivery of the instance of communications data to the second client device, re-direct delivery of the instance of communications data to the first client device, or deny delivery of the instance of communications data to the second client device; and
   delivering the instance of communications data to one of the first client device or the second client device, based at least in part on a response to the message.

8. The computer-implemented method of claim 1, further comprising:
   monitoring an operation of the second client device to detect an attempt to use the service feature;
   intercepting the attempt to use the service feature on the second client device;
   determining that use of the service feature violates the set of updated access privilege rules associated with the client account; and
   preventing use of the service feature on the second client device; and
   causing display of a message on a user interface of at least one of the first client device or the second client device, the message indicating that use of the service feature has been intercepted.

9. The computer-implemented method of claim 1, wherein the request further includes an activation parameter that triggers control of access privileges of the service feature, and further comprising:
   determining that the activation parameter permits use of the service feature during a predetermined time interval, or allots an amount of time usage or an amount of data usage that is permissible prior to triggering control of access privileges of the service feature, and
   wherein, the set of updated access privilege rules for the client account are further based at least in part on the activation parameter.

10. One or more non-transitory computer-readable media storing computer-executable instructions that, when executed on one or more processors, cause the one or more processors to perform acts comprising:
    receiving, from a client device associated with a primary account holder (PAH), a request to control access privileges of a service feature accessible with a client account, the service feature being accessible by at least a secondary account holder (SAH) via one of a plurality of client devices;
    parsing through the request to identify an activation parameter that triggers control of the access privileges relating to the service feature;
    retrieving, from a data store, one or more existing access privilege rules associated with the client account;
    analyzing a subset of the one or more existing access privilege rules that relate to service feature, based at least in part on the request;
    generating a set of updated access privilege rules for the client account, based at least in part on analysis of the subset of the one or more existing access privilege rules and the activation parameter; and
    transmitting the set of update access privilege rules to the plurality of client devices associated with the client account.

11. The one or more non-transitory computer-readable media of claim 10, wherein the activation parameter corresponds to a context of operation that triggers control of access privileges of the service feature, the context of operation corresponding to an indication, via one of the plurality of client devices, that a disposition of the SAH is a running motion, a motion within a moving vehicle, or an indication that the SAH is within a predetermined proximity of a predetermined geographic location.

12. The one or more non-transitory computer-readable media of claim 11, further storing instructions that when executed cause the one or more processors to perform acts comprising:
    determining that the SAH has established an authenticated session with a second client device of the plurality of client devices;
    monitoring an operation of the second client device to detect an attempt to use the service feature;
    determining a current context of operation of the second client device;
    intercepting the attempt to use the service feature on the second client device;
    determining that use of the service feature violates the set of updated access privilege rules associated with the client account, based at least in part on the current context of operation of the second client device; and
    preventing use of the service feature on the second client device.

13. The one or more non-transitory computer-readable media of claim 10, wherein the request further includes an indication of a duration for control of access privileges associated with the service feature, and further storing instructions that when executed cause the one or more processors to perform acts comprising:
    determining that the service feature associated with the request is a core-service feature of the client account; and
    retrieving, from the data store, a time-limit parameter that imposes a duration-limit on control of access privileges associated with core-service features, and
    wherein, generating the set of updated access privilege rules for the client account is further based at least in part on the time-limit parameter.

14. The one or more non-transitory computer-readable media of claim 10, further comprising:
    prior to receipt of the request, receiving, from the PAH via the client device, one of an impermissible-list of contacts that the SAH is not permitted to contact, or a permissible-list of contacts that the SAH is only permitted to contact;
    determining that the service feature relates to a voice-based communications channel or a text-based communications channel;
    determining that the activation parameter identifies at least one of an impermissible-list of contacts or a permissible-list of contacts; and
    retrieving, from the data store, one of the impermissible-list of contacts or the permissible-list of contacts, based at least in part on the service feature, and
    wherein, generating the set of updated access privilege rules for the client account is further based at least in part on one of the impermissible-list of contacts or the permissible-list of contacts.

15. The one or more non-transitory computer-readable media of claim 10, wherein, integrating the set of updated access privilege rules with the one or more existing access privilege rules includes at least one of modifying a subset of the one or more existing access privilege rules or deleting a subset of the one or more existing access privilege rules.

16. A system comprising:
    one or more processors;
    memory coupled to the one or more processors, the memory including one or more modules that are executable by the one or more processors to:
        receive, from a first client device associated with a first client, a request to control access privileges of at least a second client, the access privileges relating to a service feature accessible with a client account, the service feature being accessible by a plurality of client devices associated with the client account;
        determine whether the first client is authorized to control access privileges of at least the second client and access privileges relating to the service feature of the client account;
        retrieve, from a data store, existing access privilege rules associated with the client account;
        analyze a subset of the one or more existing access privilege rules that relate to the second client and the service feature;
        generate a set of updated access privilege rules, based at least in part on analysis of the subset of the one or more existing access privilege rules; and
        transmit the set of updated access privilege rules to the plurality of client devices associated with the client account.

17. The system of claim 16, wherein the one or more modules are further executable by the one or more processors to:
    transmit a message to the first client device indicating that the request to control access privileges of at least the second client is not authorization, in response to a determination that the first client is not authorized to control access privileges of at least the second client or the service feature.

18. The system of claim 16, wherein the one or more modules are further executable by the one or more processors to:
    prior to receipt of the request, receive, from the first client via the first client device, an impermissible-list of geographic locations where the second client is not permitted to access a subset of service features accessible via the client account or a permissible-list of geographic locations where the second client is only permitted to access the subset of service features; and
    determine whether the service feature associated with the request is included within the subset of service features, and
    wherein, to generate the set of updated access privilege rules is further based at least in part on one or more the impermissible-list of geographic locations or the permissible-list of geographic locations.

19. The system of claim 16, wherein the service feature identified within the request corresponds to one of a voice-based communications channel, a text-based communications channel, data-based communications channel, a user application native to at least one of the plurality of client devices associated with the client account, or an application feature associated with the user application.

20. The system of claim 16, wherein the one or more modules are further executable by the one or more processors to:
    parse through the request to identify an activation parameter that triggers control of the access privileges relating to the service feature, and
    wherein the activation parameter corresponds to one or more of a time of day, a week-day of week, an allotment of time usage for a service feature, an allotment of data usage for a service feature, a permissible-list of contacts, or an impermissible-list of contacts.

* * * * *